US012566332B1

(12) United States Patent
Chen et al.

(10) Patent No.: US 12,566,332 B1
(45) Date of Patent: Mar. 3, 2026

(54) SEE-THROUGH DISPLAYABLE EYEWEAR AND CONTROL SYSTEM THEREOF

(71) Applicant: LIQXTAL TECHNOLOGY INC., Tainan (TW)

(72) Inventors: Hung-Shan Chen, Tainan (TW); Chung-Hsien Wu, Tainan (TW); Chien-Chung Chen, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 0 days.

(21) Appl. No.: 19/186,675

(22) Filed: Apr. 23, 2025

Related U.S. Application Data

(60) Provisional application No. 63/705,044, filed on Oct. 9, 2024.

(51) Int. Cl.
    G02B 27/01 (2006.01)
    G06F 3/01 (2006.01)
(52) U.S. Cl.
    CPC .... G02B 27/0172 (2013.01); G02B 2027/014 (2013.01); G02B 2027/0141 (2013.01); G02B 2027/0178 (2013.01); G06F 3/011 (2013.01)
(58) Field of Classification Search
    CPC .......... G02B 27/0172; G02B 2027/014; G02B 2027/0141; G02B 2027/0178
    See application file for complete search history.

(56) References Cited

U.S. PATENT DOCUMENTS

| | | | |
|---|---|---|---|
| 7,828,434 B2 | 11/2010 | Coulter | |
| 8,485,661 B2 | 7/2013 | Yoo | |
| 8,622,544 B2 | 1/2014 | Brown | |
| 8,939,769 B2 | 1/2015 | Yoo | |
| 9,900,350 B2 * | 2/2018 | Roth | G06F 3/0484 |
| 10,268,438 B2 * | 4/2019 | Chen | G02B 27/017 |
| 12,360,726 B1 * | 7/2025 | Chen | G09G 3/001 |
| 12,498,895 B2 * | 12/2025 | Ive | G06F 3/1423 |
| 2015/0379896 A1 * | 12/2015 | Yang | G09B 21/00 |
| | | | 434/112 |
| 2017/0118251 A1 * | 4/2017 | Roth | H04L 63/083 |
| 2018/0004478 A1 * | 1/2018 | Chen | A63F 13/26 |
| 2024/0296002 A1 * | 9/2024 | Ive | G06F 3/1423 |

* cited by examiner

*Primary Examiner* — Michael J Jansen, II
(74) *Attorney, Agent, or Firm* — Winston Hsu

(57) ABSTRACT

A see-through displayable eyewear and a control system thereof are provided, where the see-through displayable eyewear, at least having a front surface and a back surface, is arranged to display graphic contents to a passersby who is viewing the see-through displayable eyewear from the front surface, while allowing a wearer of the see-through display-able eyewear to view from the back surface. The see-through displayable eyewear includes at least one see-through display module, at least one driver circuit, at least one computation unit, at least one memory unit, a wireless unit, and a power unit. The control system includes a control module outside the see-through displayable eyewear. The control module includes a software sub-module running on the external device, and a backend sub-module running on a remote device. The external device may link to the remote device to allow the see-through displayable eyewear to operate under control of the control module.

19 Claims, 10 Drawing Sheets

1

SEE-THROUGH DISPLAYABLE EYEWEAR AND CONTROL SYSTEM THEREOF

CROSS REFERENCE TO RELATED APPLICATIONS

This application claims the benefit of U.S. Provisional Application No. 63/705,044, filed on Oct. 9, 2024. The content of the application is incorporated herein by reference.

BACKGROUND OF THE INVENTION

1. Field of the Invention

The present invention relates to see-through display, and more particularly, to a see-through displayable eyewear and a control system thereof as well as the associated control method thereof.

2. Description of the Prior Art

Nowadays in an era of rapid technological development, the one-way reflective eyewear, as an emerging smart wearable device, is gradually gaining attention. This type of eyewear not only provides a clear field of vision at one side, but also has the function of displaying information in a reflective manner at the other side, making it more convenient for users in their daily lives. It seems that no proper solution regarding overall control has been proposed in the related art. Thus, there is a need to design an efficient control system for improving user experience and enhancing functionality.

SUMMARY OF THE INVENTION

It is an objective of the present invention to provide a see-through displayable eyewear and a control system thereof as well as the associated control method thereof, in order to solve the problems in the related art.

At least one embodiment of the present invention provides a see-through displayable eyewear at least having a front surface and a back surface, where the see-through displayable eyewear is arranged to display graphic contents to a passersby who is viewing the see-through displayable eyewear from the front surface, while allowing a wearer of the see-through displayable eyewear to view from the back surface. The see-through displayable eyewear may comprise at least one see-through display module, at least one driver circuit that is coupled to the at least one see-through display module, at least one computation unit that is coupled to the at least one driver circuit, at least one memory unit that is coupled to the at least one computation unit, a wireless unit that is coupled to the at least one computation unit, and a power unit that is coupled to the at least one see-through display module, the at least one driver circuit, the at least one computation unit, the at least one memory unit, and the wireless unit. For example, the at least one see-through display module is arranged to display the graphic contents while allowing the wearer to view with at least one eye of the wearer; the at least one driver circuit is arranged to drive the at least one see-through display module; the at least one computation unit is arranged to control operations of the see-through displayable eyewear, the operations comprising at least one command transmission operation, at least one command reception operation and at least one computation operation; the at least one memory unit is arranged to store the graphic contents; the wireless unit is arranged to perform wireless communication with an external device for the see-through displayable eyewear, to allow the wearer to control the see-through displayable eyewear via the external device; and the power unit is arranged to provide power to the at least one see-through display module, the at least one driver circuit, the at least one computation unit, the at least one memory unit, and the wireless unit. According to some embodiments, the associated control method of the see-through displayable eyewear mentioned above may comprise multiple steps for performing the respective operations of the above components within the see-through displayable eyewear.

At least one embodiment of the present invention provides a control system of the see-through displayable eyewear mentioned above, where the control system may comprise a control module outside the see-through displayable eyewear. The control module may comprise: a software sub-module running on the external device; and a backend sub-module running on a remote device, wherein the external device is arranged to link to the remote device to allow the see-through displayable eyewear to operate under control of the control module. According to some embodiments, the associated control method of the see-through displayable eyewear mentioned above may comprise multiple steps for performing the respective operations of the above components within the see-through displayable eyewear and/or the respective operations of the above sub-modules within the control module.

According to some embodiments, the control system may further comprise the see-through displayable eyewear. For example, the associated control method of the see-through displayable eyewear mentioned above may comprise multiple steps for performing the respective operations of the above components within the see-through displayable eyewear and the respective operations of the above sub-modules within the control module.

It is an advantage of the present invention that, the see-through displayable eyewear (e.g., a see-through reflective eyewear) and the control system of the present invention can ensure efficient control to enhance overall performance. In addition, the see-through displayable eyewear and the control system of the present invention can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
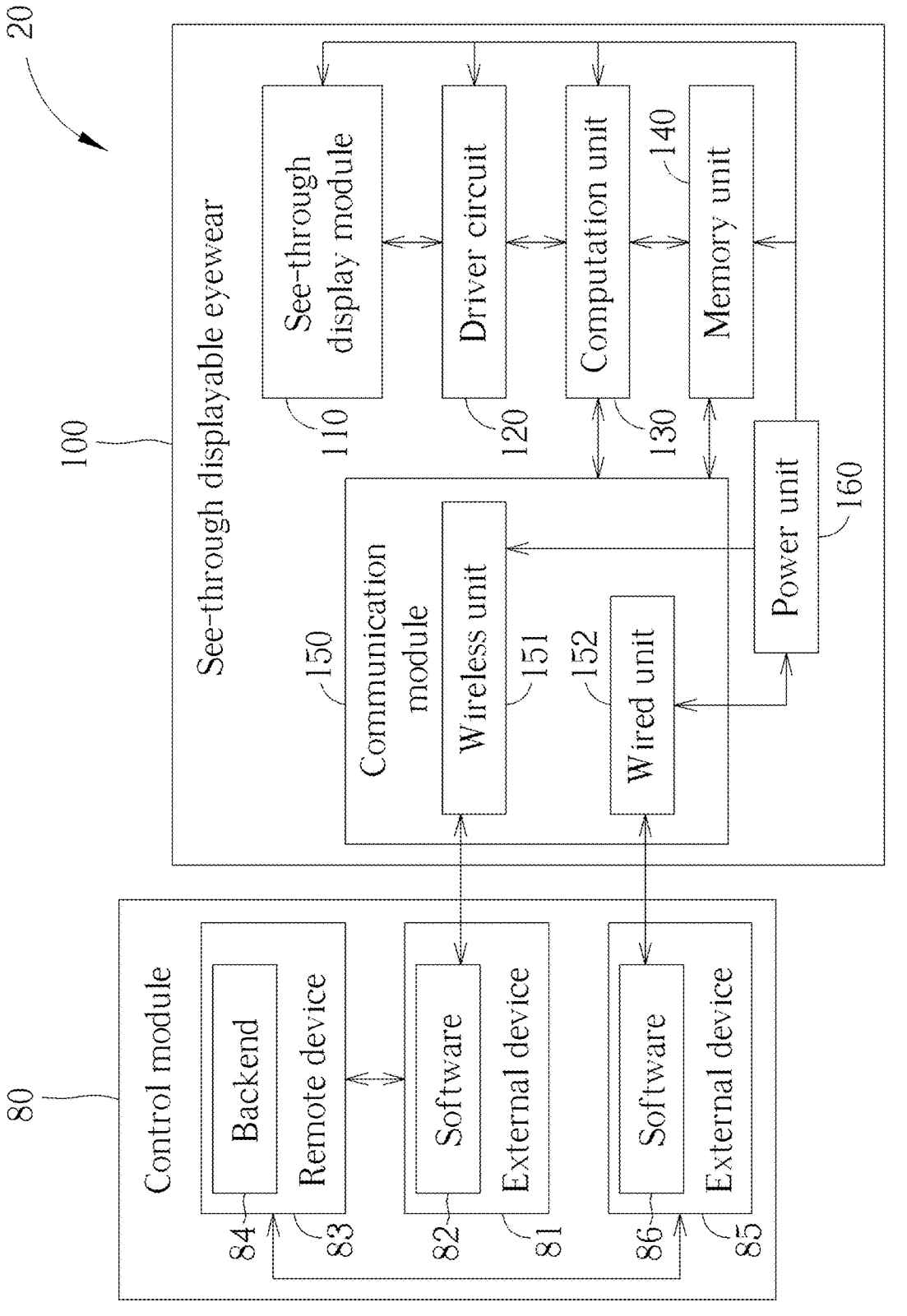
FIG. 1A is a diagram illustrating a see-through displayable eyewear and a control system thereof according to an embodiment of the present invention, where the control system comprises a control module outside the see-through displayable eyewear.
Figure 1B:
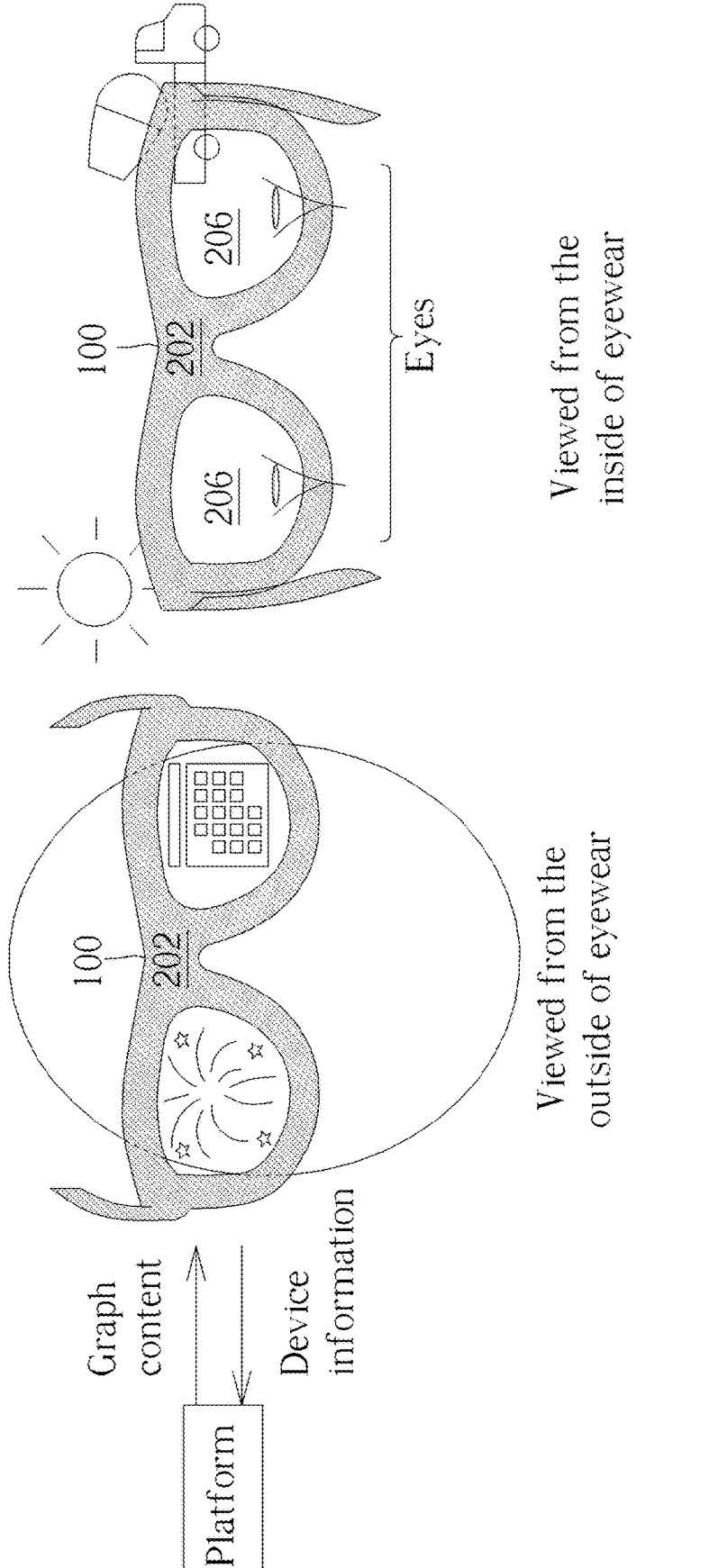
FIG. 1B illustrates different viewing features of the see-through displayable eyewear shown in FIG. 1A when it is viewed from the outside and the inside thereof, respectively.

FIG. 1A is a diagram illustrating a see-through displayable eyewear 100 and a control system 20 thereof (which may also be referred to as the see-through displayable eyewear control system) according to an embodiment of the present invention, and FIG. 1B illustrates different viewing features of the see-through displayable eyewear 100 shown in FIG. 1A when it is viewed from the outside and the inside thereof, respectively, where the control system 20 comprises a control module 80 outside the see-through displayable eyewear 100. The see-through displayable eyewear 100, at least having a front surface and a back surface, can be arranged to display graphic contents to a passersby who is viewing the see-through displayable eyewear 100 from the front surface, while allowing a wearer of the see-through displayable eyewear 100 to view from the back surface. As shown in FIG. 1B, the platform can generate and output various kinds of image/graph/graphic contents such as the graphic contents mentioned above, and input and collect device information of the see-through displayable eyewear 100. For example, the platform can be implemented by way of multiple sub-modules of the control module 80. As the control module 80 may be regarded as a system level module in the control system 20, the multiple sub-modules of the control module 80 may be regarded as multiple system-level sub-modules. The see-through displayable eyewear 100 displays the graphic contents to the passersby, and as shown in the right half part of FIG. 1B, the displaying (or the operation of displaying the graphic contents) has limited effect to the wearer's sight, and therefore, the wearer wearing the see-through displayable eyewear 100 can see the world clearly by viewing from the back surface.

As shown in FIG. 1A, the see-through displayable eyewear 100 may comprise at least one see-through display module such as one or more see-through display modules, collectively referred to as the see-through display module 110, at least one driver circuit such as one or more driver circuits, collectively referred to as the driver circuit 120, at least one computation unit such as one or more computation units, collectively referred to as the computation unit 130, at least one memory unit such as one or more memory units, collectively referred to as the memory unit 140, a communication module 150 at least comprising a wireless communication unit 151 (or "the wireless unit 151" for brevity), and a power unit 160, where the above components may be coupled to each other. In addition, the control module 80 (or the multiple sub-modules thereof) may comprise a software sub-module 82 (labeled "Software" for brevity) running on an external device 81 and a backend sub-module 84 (labeled "Backend" for brevity) running on a remote device 83, where the external device 81 is arranged to link to the remote device 83 to allow the see-through displayable eyewear 100 to operate under control of the control module 80. The external device 81 may be implemented by way of a multifunctional mobile phone running an operating system (OS) (e.g., Android or iOS), and the remote device 83 may be implemented by way of a server. According to some embodiments, the control system 20 may further comprise the see-through displayable eyewear 100. For better comprehension, the see-through display module 110 mentioned above may comprise two see-through display modules 206 (e.g., the two see-through display modules 206 respectively corresponding to two eyes of the wear) installed at a frame 202 of the see-through displayable eyewear 100 as shown in FIG. 1B, but the present invention is not limited thereto. In some examples, the display module count of the see-through display module 110 may vary.

The see-through display module 110 can display the graphic contents while allowing the wearer to view with at least one eye (e.g., the two eyes) of the wearer, the driver circuit 120 can drive the see-through display module 110, the computation unit 130 can control operations (e.g., at least one command transmission operation, at least one command reception operation and at least one computation operation) of the see-through displayable eyewear 100, the memory unit 140 can store the graphic contents, the wireless unit 151 can perform wireless communication with the external device 81 for the see-through displayable eyewear 100, to allow the wearer to control the see-through displayable eyewear 100 via the external device 81, and the power unit 160 can provide power to the see-through display module 110, the driver circuit 120, the computation unit 130, the memory unit 140, and the communication module 150 (or the wireless unit 151 therein). For example, the aforementioned at least one command transmission operation may comprise an operation of transmitting a playback command to the see-through display module 110, the aforementioned at least one command reception operation may comprise an operation of receiving an external command from the external device 81, and the aforementioned at least one computation operation may comprise multiple image processing operations as well as flow control and logic determination operations, where the multiple image processing operations may comprise one or a combination of blending, color replacement, format conversion, etc., and more particularly, may comprise all of these image processing operations.

Preferably, the see-through displayable eyewear 100 (or the communication module 150) may further comprise a wired communication unit 152 (or "the wired unit 152" for brevity) that is coupled to the computation unit 130. The wired communication unit 152 can perform wired communication with another external device 85 for the see-through displayable eyewear 100, to allow the wearer to control the see-through displayable eyewear 100 via the external device 85, where the aforementioned at least one command reception operation may further comprise an operation of receiving an external command from the external device 85. For example, the see-through displayable eyewear 100 and the external device 85 may be equipped with Universal Serial Bus (USB) ports for coupling to each other, and perform the wired communication conforming to the USB protocol. Additionally, the control module 80 (or the multiple sub-modules thereof) may further comprise a software sub-module 86 (labeled "Software" for brevity) running on the external device 85. The external device 85 can link to the remote device 83 to allow the see-through displayable eyewear 100 to operate under control of the control module 80. The external device 85 may be implemented by way of a personal computer (e.g., a laptop computer or a desktop computer) running an OS (e.g., Windows).

According to some embodiments, the see-through display module 110 may comprise at least one partially reflective mirror coating (e.g., one or more partially reflective mirror coatings) and at least one liquid crystal display (LCD) panel (e.g., one or more LCD panels), and any LCD panel among the aforementioned at least one LCD panel may comprise multiple pixels disposed in a two-dimensional (2D) array arrangement to display the graphic contents, where the optical properties of the multiple pixels are controlled with passive or active matrix circuitry and a display driver integrated circuit. For example, the multiple pixels may comprise one hundred or more pixels, and an aperture ratio of the multiple pixels may be greater than or equal to 80%. In some embodiments, the pixel count of the multiple pixels and/or the range of the aperture ratio of the multiple pixels may vary.

Figure 2:
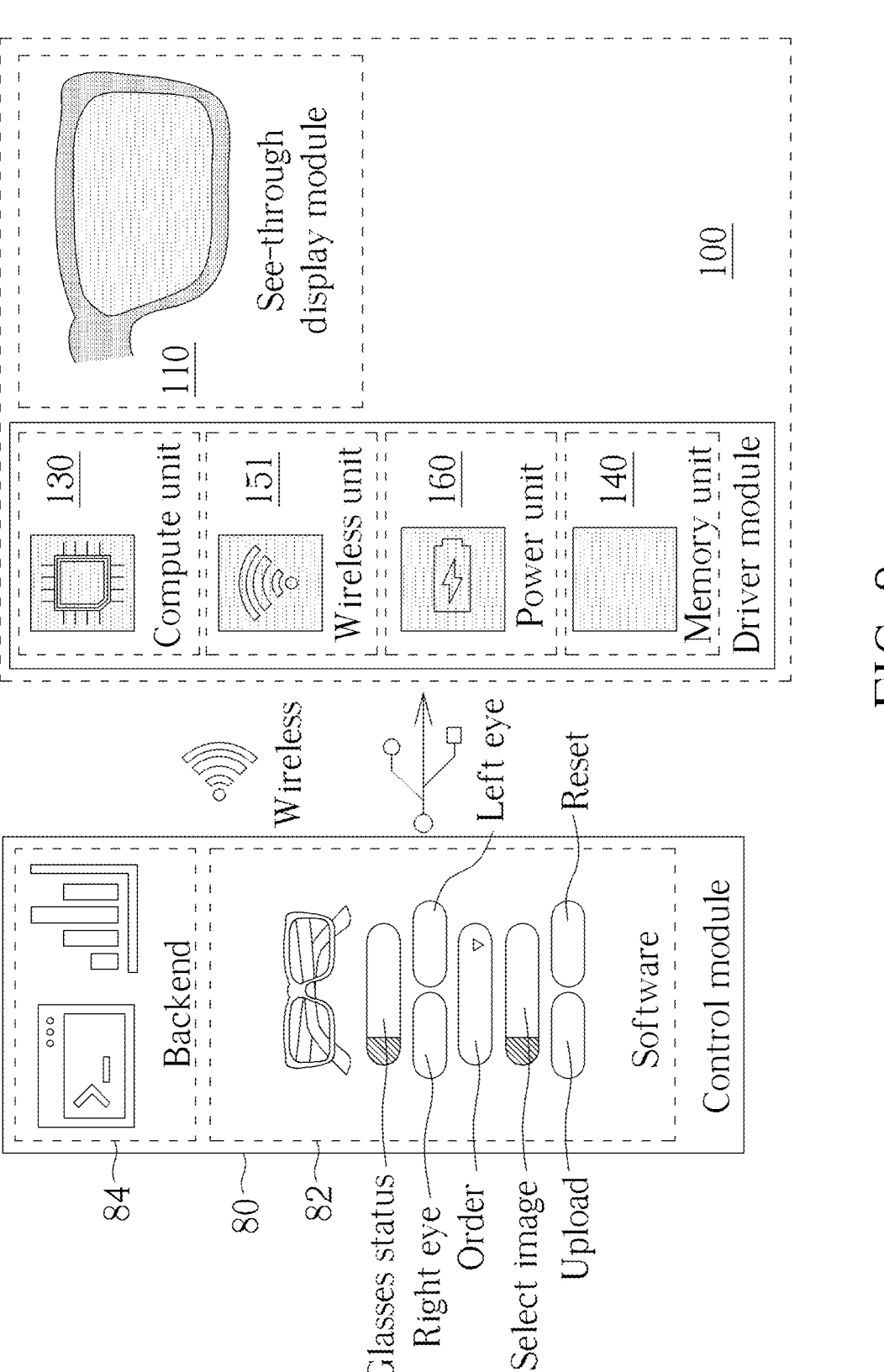
FIG. 2 is a diagram illustrating the control module and a partial architecture of the see-through displayable eyewear in the architecture shown in FIG. 1A according to an embodiment of the present invention.

FIG. 2 is a diagram illustrating the control module 80 and a partial architecture of the see-through displayable eyewear 100 in the architecture shown in FIG. 1A according to an embodiment of the present invention. In the see-through displayable eyewear 100, a driver module for controlling and/or driving the see-through display module 110 may comprise some other components such as the computation unit 130 (or "the compute unit 130" for brevity), the wireless unit 151, the power unit 160 and the memory unit 140. The see-through display module 110 may comprise the display panels (e.g., the LCD panels), which are responsible for showing the image such as the graphic contents mentioned above. The driver module can power up and control the display panels, and the interfaces of the driver module, such as the wireless unit 151 and the wired unit 152 mentioned above, can perform communication using wired and wireless protocols, respectively. The control module 80 provides an interface (e.g., a user interface) for the user(s) such as the wearer to operate the device such as the see-through displayable eyewear 100, either through a graphical user interface (GUI) or a command-line interface (CLI). The CLI allows the user(s) to input text commands, offering more precise control and flexibility, which is especially useful for advanced users or automation.

The software sub-module 82 running on the external device 81 can provide the user interface such as a human-machine interface, allowing a user which is the wearer to operate integrated functions while observing information on the see-through displayable eyewear 100, for achieving user login of the user, device binding of the see-through displayable eyewear 100 with an account of the user, device function setting of the see-through displayable eyewear 100, controlling pictures, and reading device information comprising battery level and troubleshooting contacts. In addition, the backend sub-module 84 running on the remote device 83 can provide an engineering human-machine interface that not only enables a function for software execution, but also provides an account verification mechanism, device data storage and association, error code logging, and troubleshooting suggestions. For example, multiple picture control functions of controlling the pictures (or images/graph/graphic contents) may comprise one or a combination of the respective functions of editing, purchasing, selling via financial flow, transmitting, and receiving, and more particularly, may comprise all of these functions, for providing a platform for multiple users, the multiple users comprising the user, to interact with each other. The backend sub-module 84 running on the remote device 83 can further provide management and information security functions, the management and information security functions comprising:

(1) a function of multi-user management, for managing, by the backend sub-module 84, multiple user accounts, and providing, by the backend sub-module 84, device binding of a plurality of see-through displayable eyewear comprising the see-through displayable eyewear 100 with the multiple user accounts, respectively, user login authentication, and data synchronization between multiple devices; and (2) a function of security and data encryption, for protecting, by the backend sub-module 84, security of image contents and user data via encryption technology, for application in data transmission and storage.

Additionally, at least one (e.g., one or both) of the see-through displayable eyewear 100 and the software sub-module 82 running on the external device 81 can link to at least one sensing device (e.g., one or more sensing devices), to allow the see-through displayable eyewear 100 to display the graphic contents according to a user context captured (or sensed) by the at least one sensing device. For example, the aforementioned at least one sensing device may comprise one or a combination of at least one motion sensor, at least one light sensor, at least one camera and at least one touch sensor, and more particularly, may comprise all of these sensing devices.

According to some embodiments, in a situation where the see-through displayable eyewear 100 is linked to an external module as a replacement of the control module 80, the see-through displayable eyewear 100 is arranged to operate under control of the external module, to allow a leader owning the external module to control displaying of the see-through displayable eyewear 100 via the external module, in either a manual manner or an automatic manner. More particularly, the external module is implemented as a central control device for controlling the plurality of see-through displayable eyewear at a same time. The see-through displayable eyewear 100 as one of the plurality of see-through displayable eyewear is equipped with a set of application interfaces (APIs), allowing at least one external application or service to control image display and sensor data reading (e.g., the reading of sensor data such as light, motion, temperature) of the see-through displayable eyewear 100, and send commands to control brightness and content update of the see-through display module 110. For achieving information security and providing core functions regarding the see-through displayable eyewear 100 to at least one third-party developer or partner at a same time, the see-through displayable eyewear 100 can be arranged to operate with:

(1) security of third-party extensions, the security of third-party extensions defining at least one security mechanism for using the APIs and extension modules, for ensuring that none of third-party software and third-party hardware will endanger system security, where encryption technology, user authentication mechanism and permission control are introduced in the aforementioned at least one security mechanism to ensure data integrity and privacy; and (2) a permission management system in the backend sub-module 84, the permission management system for strictly controlling access permissions for the third-party software and the third-party hardware, where the permission management system can be arranged to provide a hierarchical permission control mechanism, allowing an administrator to set access levels for different third-party modules or APIs to ensure that only authorized applications are capable of accessing specific functions.

According to some embodiments, the computation unit 130 can be implemented by way of at least one microcontroller unit (MCU), the memory unit 140 can be implemented by way of one or a combination of at least one non-volatile memory (e.g., at least one flash memory) and at least one volatile memory (e.g., at least one static random-access memory (SRAM)), the wireless unit. 151 can be implemented by way of at least one wireless communication circuit such as one or more wireless communication circuits among multiple wireless communication circuits respectively corresponding to different wireless communication protocols, and the power unit 160 can be implemented by way of one or a combination of a power storage device and a power generation device.

Figure 3A:
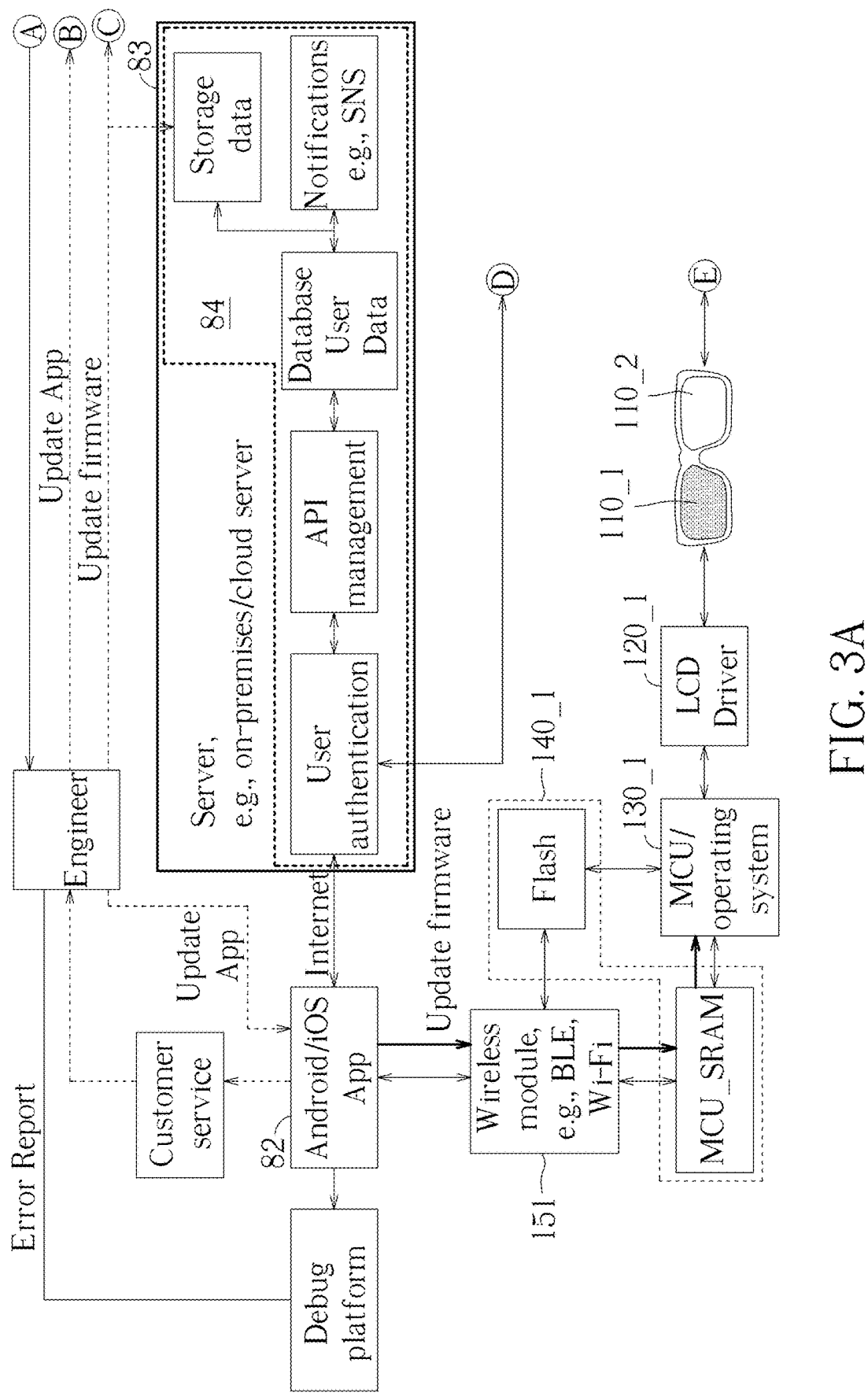
FIG. 3A illustrates a first part of a multi-computation-unit product architecture involved with the see-through displayable eyewear shown in FIG. 1A according to an embodiment of the present invention.
Figure 3B:
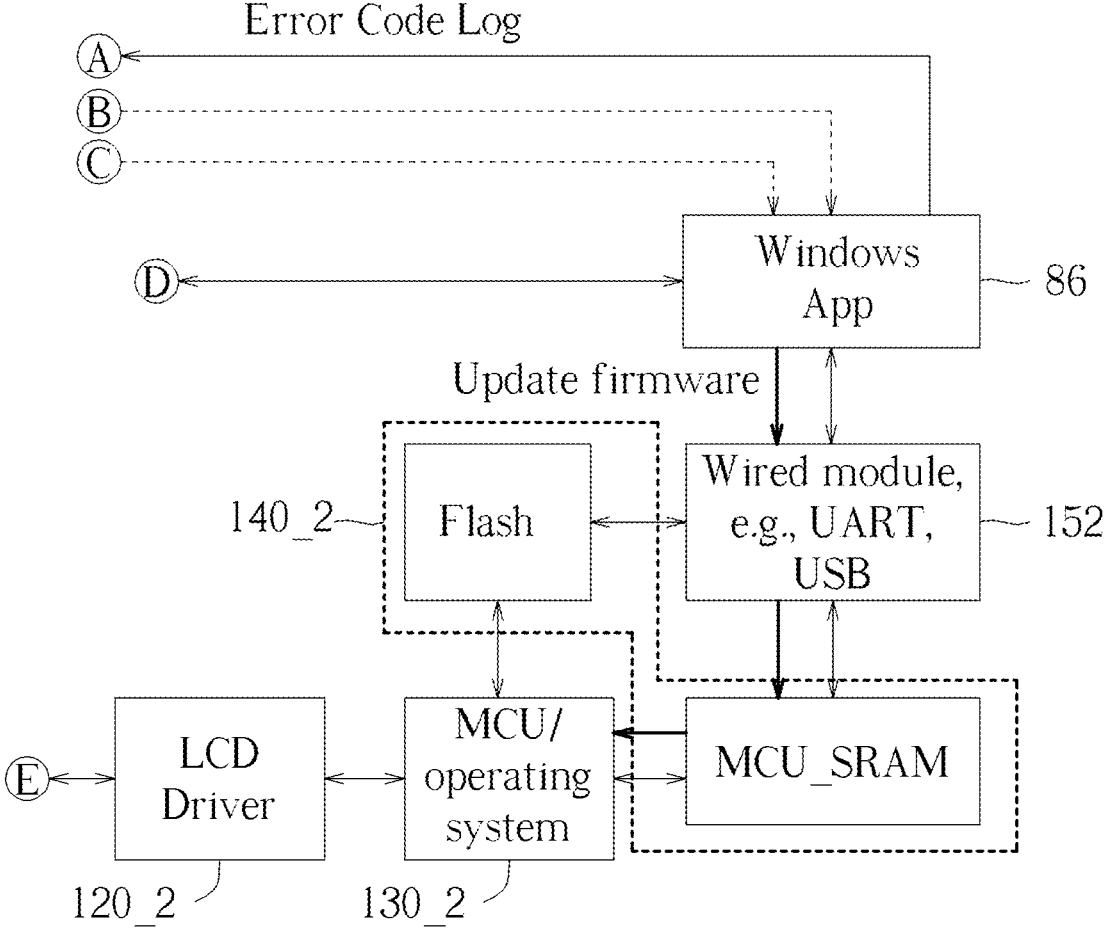
FIG. 3B illustrates a second part of the multi-computation-unit product architecture.

FIG. 3A and FIG. 3B illustrate a first part and a second part of a multi-computation-unit product architecture involved with the see-through displayable eyewear 100 shown in FIG. 1A according to an embodiment of the present invention, respectively, but the present invention is not limited thereto. According to some embodiments, the product architecture involved with the see-through displayable eyewear 100 may vary. In addition, the first part and the second part of the multi-computation-unit product architecture can be connected to each other via the nodes A, B, C, D and E.

As shown in FIG. 3A and FIG. 3B, for the case that each number among the respective numbers of the see-through display module 110, the driver circuit 120, the computation unit 130 and the memory unit 140 mentioned above is greater than one, the see-through display module 110 comprises multiple see-through display modules 110_1 and 110_2 (illustrated as being installed at the frame mentioned above in FIG. 3A for better comprehension), the driver circuit 120 comprises multiple driver circuits 120_1 and 120_2 (which may be implemented as LCD driver circuits and therefore labeled "LCD driver" for brevity) respectively corresponding to the multiple see-through display modules 110_1 and 110_2, the computation unit 130 comprises multiple computation units 130_1 and 130_2 (which may be implemented as MCUs with operating systems respectively running thereon and therefore labeled "MCU/operating system" for brevity) for controlling the multiple see-through display modules 110_1 and 110_2 via the multiple driver circuits 120_1 and 120_2, respectively, and the memory unit 140 comprises multiple sets of memory units 140_1 and 140_2, any set of memory units among which comprise a non-volatile memory such as a flash memory and a volatile memory such as an SRAM dedicated to the MCU (respectively labeled "Flash" and "MCU SRAM" for brevity). More particularly, one of the multiple computation units 130_1 and 130_2 is arranged to act as a master computation unit and another of the multiple computation units 130_1 and 130_2 is arranged to act as a slave computation unit. The timing of the slave computation unit is synchronized with the timing of the master computation unit to guarantee simultaneously displaying a first set of graphic/text contents and a second set of graphic/text contents among the graphic contents with the multiple see-through display modules, respectively. In addition, the memory unit 140 (or the aforementioned any set of memory units among the multiple sets of memory units 140_1 and 140_2) can store the graphic contents as well as firmware codes regarding controlling the operations of the see-through displayable eyewear 100. According to some embodiments, at least one partial memory among the memory unit 140, such as the SRAM within the aforementioned any set of memory units, can be integrated into the computation unit 130. For example, the SRAM in the set of memory units 140_1 can be integrated into the MCU within the computation unit 130_1, and the SRAM in the set of memory units 140_2 can be integrated into the MCU within the computation unit 130_2.

The wireless unit 151 can be implemented by way of the aforementioned at least one wireless communication circuit such as one or more wireless communication circuits among the wireless communication circuits conforming to the Bluetooth Low Energy (BLE) specification, the Wi-Fi specification, etc. (labeled "Wireless module, e.g., BLE, Wi-Fi" for brevity), and the wired unit 152 can be implemented by way of at least one wired communication circuit such as one or more wired communication circuits among the wired communication circuits conforming to the Universal Asynchronous Receiver/Transmitter (UART) specification, USB specification, etc. (labeled "Wired module, e.g., UART, USB" for brevity). In addition, the software sub-module 82 running on the external device 81 can be implemented by way of an application (App) designed for the OS such as Android or iOS (labeled "Android/iOS App" for brevity), and the software sub-module 86 running on the external device 85 can be implemented by way of an App designed for the OS such as Windows (labeled "Windows App" for brevity). The backend sub-module 84 running on the remote device 83 such as the server may comprise multiple device-level sub-modules such as a user authentication module, an API management module, a database user data module, a storage data module and a notifications module (respectively labeled "User authentication", "API management", "Database User Data", "Storage data" and "Notifications" for brevity), for performing user authentication, performing API management, managing user data in a database, managing storage date of the user data and generating/sending notifications using at least one predetermined service (e.g., at least one social networking service (SNS) such as one or more SNSs), respectively.

Regarding the paths illustrated with arrows pointing toward/from the engineer and the customer service, the Error Report path from the debug platform running on the external device 81 to the engineer and the Error Code Log path from the software sub-module 86 to the engineer may correspond to multiple automatic operations (or automatic behaviors), and the other paths such as the user opinion feedback path from the software sub-module 82 to the customer service, the user opinion forward path from the customer service to the engineer, the Update App paths from the engineer to the software sub-module 82 and the software sub-module 86, and the Update firmware paths from the engineer to the storage data module and the software sub-module 86 may correspond to multiple non-automatic operations (or non-automatic behaviors). The multiple automatic operations may comprise a first automatic operation of sending the Error Report from the debug platform running on the external device 81 to the engineer via the Error Report path, and a second automatic operation of sending the Error Code Log from the software sub-module 86 to the engineer via the Error Code Log path. The multiple non-automatic operations may comprise a first non-automatic operation of sending a user opinion from the software sub-module 82 to the customer service via the user opinion feedback path, a second non-automatic operation of forwarding the user opinion from the customer service to the engineer via the user opinion forward path, third non-automatic operations of updating the Apps such as the Android/iOS App and the Windows App from the engineer to the software sub-module 82 and the software sub-module 86 via the Update App paths, respectively, and fourth non-automatic operations of sending the latest firmware to the storage data module and the software sub-module 86 via the Update firmware paths mentioned above, allowing subsequent operations such as firmware-update-related operations to be performed automatically. For example, the backend sub-module 84 can send the latest firmware to the software sub-module 82 via the Internet, and the software sub-module 82 can send and/or update the latest firmware into the see-through displayable eyewear 100 via the subsequent Update firmware paths (e.g., the Update firmware paths starting from software sub-module 82, passing through the wireless unit 151 and the multiple sets of memory units 140_1 and 140_2, and reaching the multiple computation units 130_1 and 130_2), allowing the multiple computation units 130_1 and 130_2 to complete updating the latest firmware. In another example, the software sub-module 86 can send and/or update the latest firmware into the see-through displayable eyewear 100 via the subsequent Update firmware paths (e.g., the Update firmware paths starting from software sub-module 86, passing through the wired unit 152 and the multiple sets of memory units 140_1 and 140_2, and reaching the multiple computation units 130_1 and 130_2), allowing the multiple computation units 130_1 and 130_2 to complete updating the latest firmware.

Figure 4:
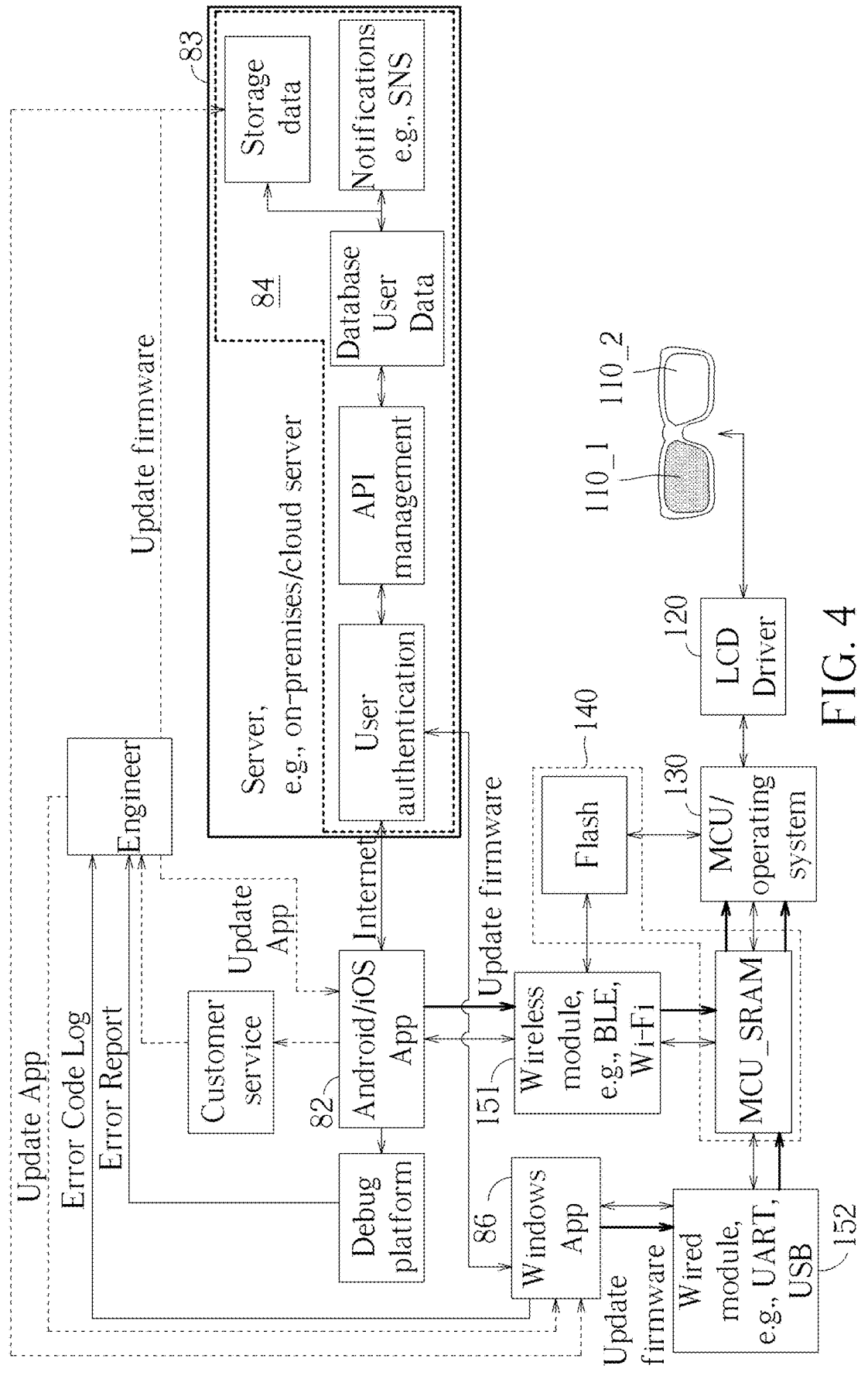
FIG. 4 illustrates a single-computation-unit product architecture involved with the see-through displayable eyewear shown in FIG. 1A according to an embodiment of the present invention.

FIG. 4 illustrates a single-computation-unit product architecture involved with the see-through displayable eyewear 100 shown in FIG. 1A according to an embodiment of the present invention, but the present invention is not limited thereto. According to some embodiments, the product architecture involved with the see-through displayable eyewear 100 may vary. In comparison with the multi-computation-unit product architecture shown in FIG. 3A and FIG. 3B, the multiple driver circuits 120_1 and 120_2, the multiple computation units 130_1 and 130_2, and the multiple sets of memory units 140_1 and 140_2 mentioned above can be integrated into a single driver circuit such as the driver circuit 120, a single computation unit such as the computation unit 130, and a single set of memory units such as the memory units 140 in the single-computation-unit product architecture, and the associated operations and paths can be changed correspondingly. For brevity, similar descriptions for this embodiment are not repeated in detail here.

Some implementation details can be further described as follows. In any architecture among the multi-computation-unit product architecture shown in FIG. 3A and FIG. 3B and the single-computation-unit product architecture shown in FIG. 4, the LCD driver circuit(s) for implementing the driver circuits 120, 120_1 and/or 120_2 can be positioned on the hardware circuit or on the panel, and can control and transmit information through the wired module or the wireless module, using the wired or wireless communication protocols. The user interfaces can be established on the operating systems of the external devices 81 and 85 such as mobile phones, tablets, computers, etc. Examples of the operating systems of the external devices 81 and 85 may include, but are not limited to: Android, ios, and Windows. On the system side, the associated persons (e.g., the engineer) can bury or deploy the error code log for debugging or use the debug platform to assist in organizing the error report. After discussion and evaluation, the parity (e.g., the company) maintaining the control system 20 can decide to handle the situation by having the engineering staff update the user interface (or the App providing the user interface) or the firmware. The update of the firmware can be stored through the server system (or the server) or the user interface software such as the App, and for the latter, updating the user interface should be performed first, for completing the architecture required for a product. For brevity, similar descriptions for these embodiments are not repeated in detail here.

According to some embodiments, the software such as the sub-module 82 or the backend such as the backend sub-module 84 can generate the graphic contents and transmit them to the see-through displayable eyewear 100, in order to control the see-through displayable eyewear 100 to display the graphic contents. Examples of the external device 81 may include, but not limited to: various kinds of smartphones/multifunctional mobile phones, various kinds of computers such as a desktop computer, a laptop computers and a tablet, various kinds of broadcast systems and in-vehicle systems, etc. Examples of the remote device 83 may include, but not limited to: various kinds of servers such as an on-premises server and a cloud server. For brevity, similar descriptions for these embodiments are not repeated in detail here.

Figure 5A:
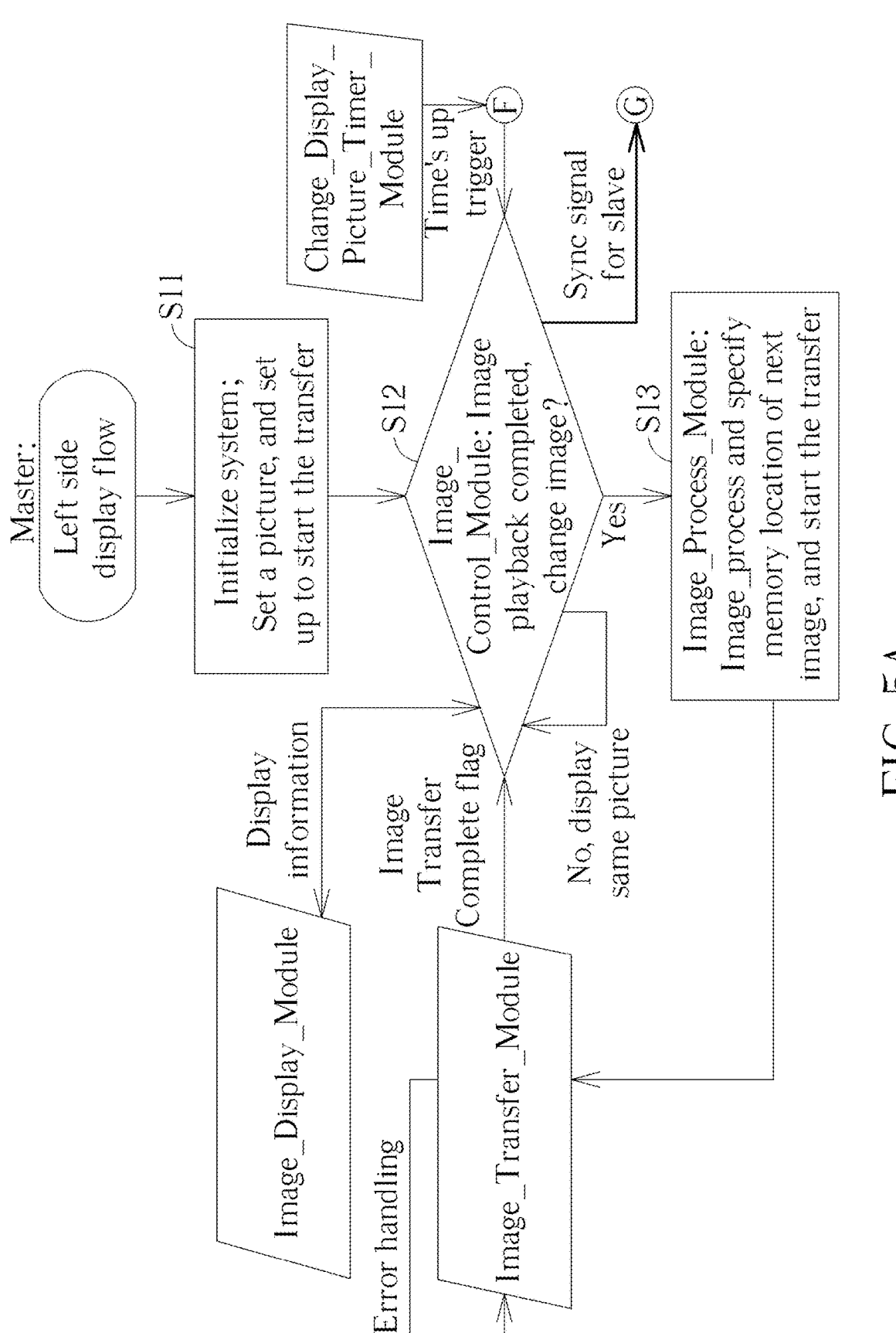
FIG. 5A illustrates a first part of a multi-computation-unit playback working flow involved with the see-through displayable eyewear shown in FIG. 1A according to an embodiment of the present invention.
Figure 5B:
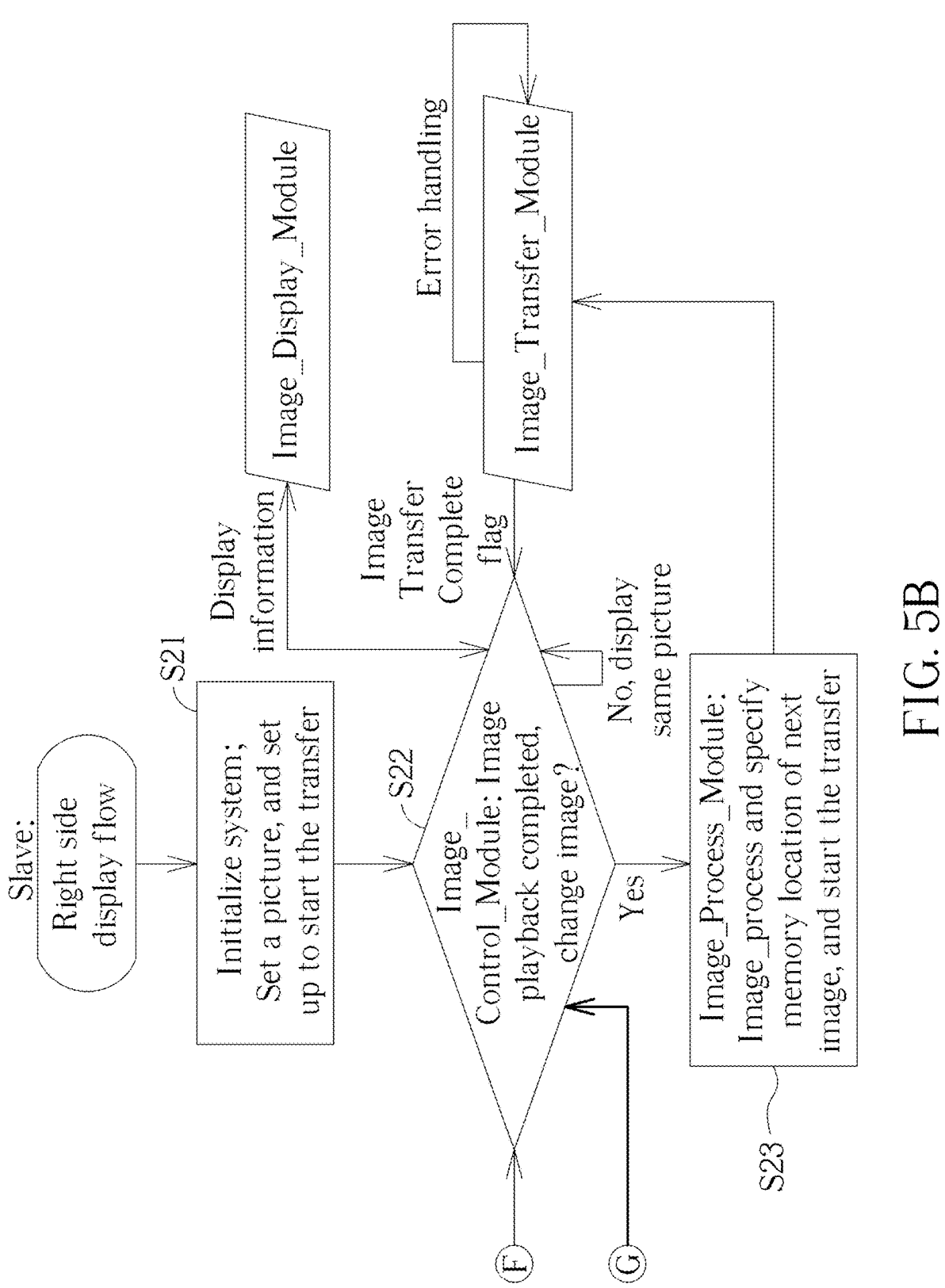
FIG. 5B illustrates a second part of the multi-computation-unit playback working flow.

FIG. 5A and FIG. 5B illustrate a first part and a second part of a multi-computation-unit playback working flow involved with the see-through displayable eyewear 100 shown in FIG. 1A according to an embodiment of the present invention, respectively, where the multi-computation-unit playback working flow may correspond to the multi-computation-unit product architecture shown in FIG. 3A and FIG. 3B, and the part and first the second part of the multi-computation-unit playback working flow can be connected to each other via the nodes F and G. The multi-computation-unit playback working flow can be used for illustrating the working flow and the logic control within the control/computation unit such as the multiple computation units 130_1 and 130_2. The parallelograms may represent in-MCU peripheral modules (e.g., function-specific modules within the MCU, such as function-specific hardware circuit modules), for providing functions that do not occupy the main programs' resources and triggering event signals, the rectangles may represent the processes in the main working flow, and the diamonds may represent logic decisions. For example, the in-MCU peripheral modules such as the function-specific modules may act as the Timer Module for Changing Display Picture (or "Change_Display_Picture-_Timer_Module"), the Image Transfer Modules (or "Image_Transfer_Modules"), and the Image Display Modules (or "Image_Display_Modules"), respectively. When using the multiple computation units 130_1 and 130_2, one of the multiple computation units 130_1 and 130_2 can act as the master, and the other of the multiple computation units 130_1 and 130_2 can act as the slave. The master can provide at least one signal (e.g., synchronization (Sync) signal) as at least one external trigger to the slave, in order to achieve the function of synchronizing the display time of the multiple see-through display modules 110_1 and 110_2. In addition, some functions can be extracted to the in-MCU peripheral modules (e.g., the function-specific modules) to properly allocate system resources to improve usage efficiency.

In Step S11, the computation unit 130_1 (or the main program running thereon) can initialize the system thereof, and set a picture/image, and set up to start the transfer of the picture/image.

In Step S12, the computation unit 130_1 can utilize a module within the main program running thereon, such as the Image Control Module (or "Image_Control_Module"), to determine whether the image playback is completed, and therefore determine whether to change image. If Yes, Step S13 is entered; if No, Step S12 is re-entered to continue displaying the same picture/image. The Image Control Module and the Image Display Module within the same computation unit 130_1 can exchange the display information with each other, for controlling the driver circuit 120_1 with the Image Display Module to drive the see-through display module 110_1 to display the picture/image.

In Step S13, the computation unit 130_1 can utilize another module within the main program running thereon, such as the Image Process Module (or "Image_Process-_Module") to perform Image process (or "Image_process") and specify the memory location of the next image, and start the image transfer such as the transfer of the next image. The Image Control Module, the Image Process Module and the Image Transfer Module within the same computation unit 130_1 can exchange information with each other, where the Image Transfer Module can perform error handling, and send the Image Transfer Complete flag to the Image Control Module when the image transfer is completed.

In Step S21, the computation unit 130_2 (or the main program running thereon) can initialize the system thereof, and set a picture/image, and set up to start the transfer of the picture/image.

In Step S22, the computation unit 130_2 can utilize a module within the main program running thereon, such as the Image Control Module (or "Image_Control_Module"), to determine whether the image playback is completed, and therefore determine whether to change image. If Yes, Step S23 is entered; if No, Step S22 is re-entered to continue displaying the same picture/image. The Image Control Module and the Image Display Module within the same computation unit 130_2 can exchange the display information with each other, for controlling the driver circuit 120_2 with the Image Display Module to drive the see-through display module 110_2 to display the picture/image.

In Step S23, the computation unit 130_2 can utilize another module within the main program running thereon, such as the Image Process Module (or "Image_Process-_Module") to perform Image process (or "Image_process") and specify the memory location of the next image, and start the image transfer such as the transfer of the next image. The Image Control Module, the Image Process Module and the Image Transfer Module within the same computation unit 130_2 can exchange information with each other, where the Image Transfer Module can perform Error handling, and send the Image Transfer Complete flag to the Image Control Module when the image transfer is completed.

For better comprehension, the control method of the see-through displayable eyewear 100 may be illustrated with the working flow shown in FIG. 5A and FIG. 5B, but the present invention is not limited thereto. According to some embodiments, one or more steps may be added, deleted, or changed in the working flow shown in FIG. 5A and FIG. 5B.

In the embodiment shown in FIG. 5A and FIG. 5B, the left side display flow and the right side display flow may correspond to the master and the slave, respectively, but the present invention is not limited thereto. According to some embodiments, the right side display flow and the left side display flow may correspond to the master and the slave, respectively. For brevity, similar descriptions for these embodiments are not repeated in detail here.

Figure 6:
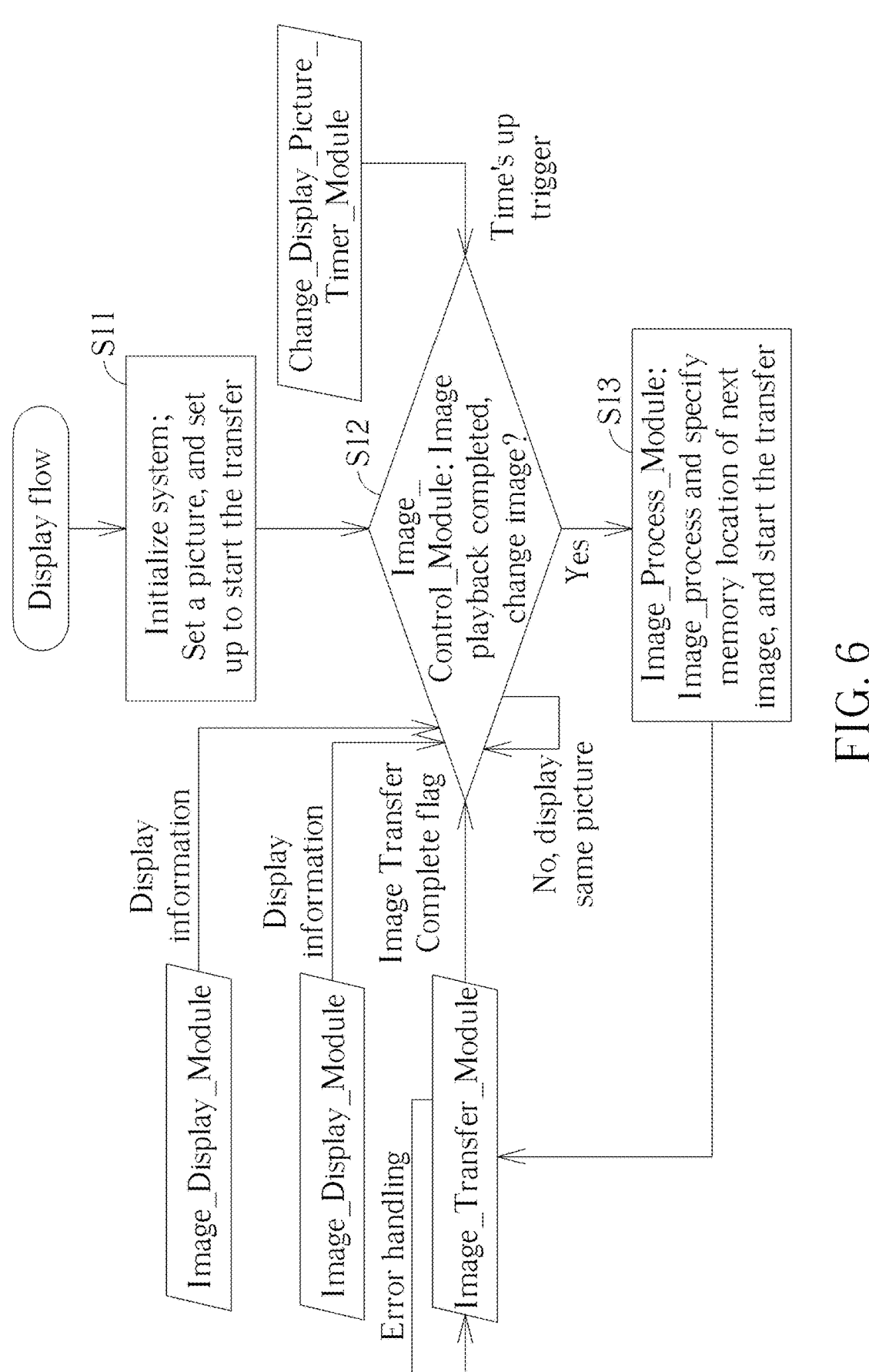
FIG. 6 illustrates a single-computation-unit playback working flow involved with the see-through displayable eyewear shown in FIG. 1A according to an embodiment of the present invention.

FIG. 6 illustrates a single-computation-unit playback working flow involved with the see-through displayable eyewear 100 shown in FIG. 1A according to an embodiment of the present invention, where the single-computation-unit playback working flow may correspond to the single-computation-unit product architecture shown in FIG. 4. In comparison with the embodiment shown in FIG. 5A and FIG. 5B, the steps, the computation units 130_1 and 130_2, the main programs running thereon, the function-specific modules, the associated operations, etc. of two sides (e.g., the master side and the slave side) can be integrated into that of one side as shown in FIG. 6. For example, the computation units 130_1 and 130_2 can be replaced with the computation unit 130 to execute Steps S11 to S13 shown in FIG. 6, for controlling the driver circuit 120 with the Image Display Modules to drive the multiple see-through display modules 110_1 and 110_2 to display the picture/image. For brevity, similar descriptions for this embodiment are not repeated in detail here.

For better comprehension, the control method of the see-through displayable eyewear 100 may be illustrated with the working flow shown in FIG. 6, but the present invention is not limited thereto. According to some embodiments, one or more steps may be added, deleted, or changed in the working flow shown in FIG. 6.

Some implementation details can be further described as follows. In any architecture among the multi-computation-unit playback working flow shown in FIG. 5A and FIG. 5B and the single-computation-unit playback working flow shown in FIG. 6, when any computation unit among the computation units 130, 130_1 and 130_2 involved with the above working flows is initialized, the in-MCU peripheral modules therein (e.g., the function-specific modules acting as the Timer Module, the Image Transfer Module, and the Image Display Module, respectively) will wait for triggering or start running. After the Image Transfer Module is ready for providing the image to the main program of this computation unit, when the Timer Module provides the correct time point to this main program, the main program(s) (e.g., the main program for the case of FIG. 6, or the main programs that are synchronized with the sync signal for the case of FIG. 5A and FIG. 5B) can start or turn on the Image Display Modules to start displaying the images on the panels. For brevity, similar descriptions for these embodiments are not repeated in detail here.

Figure 7:
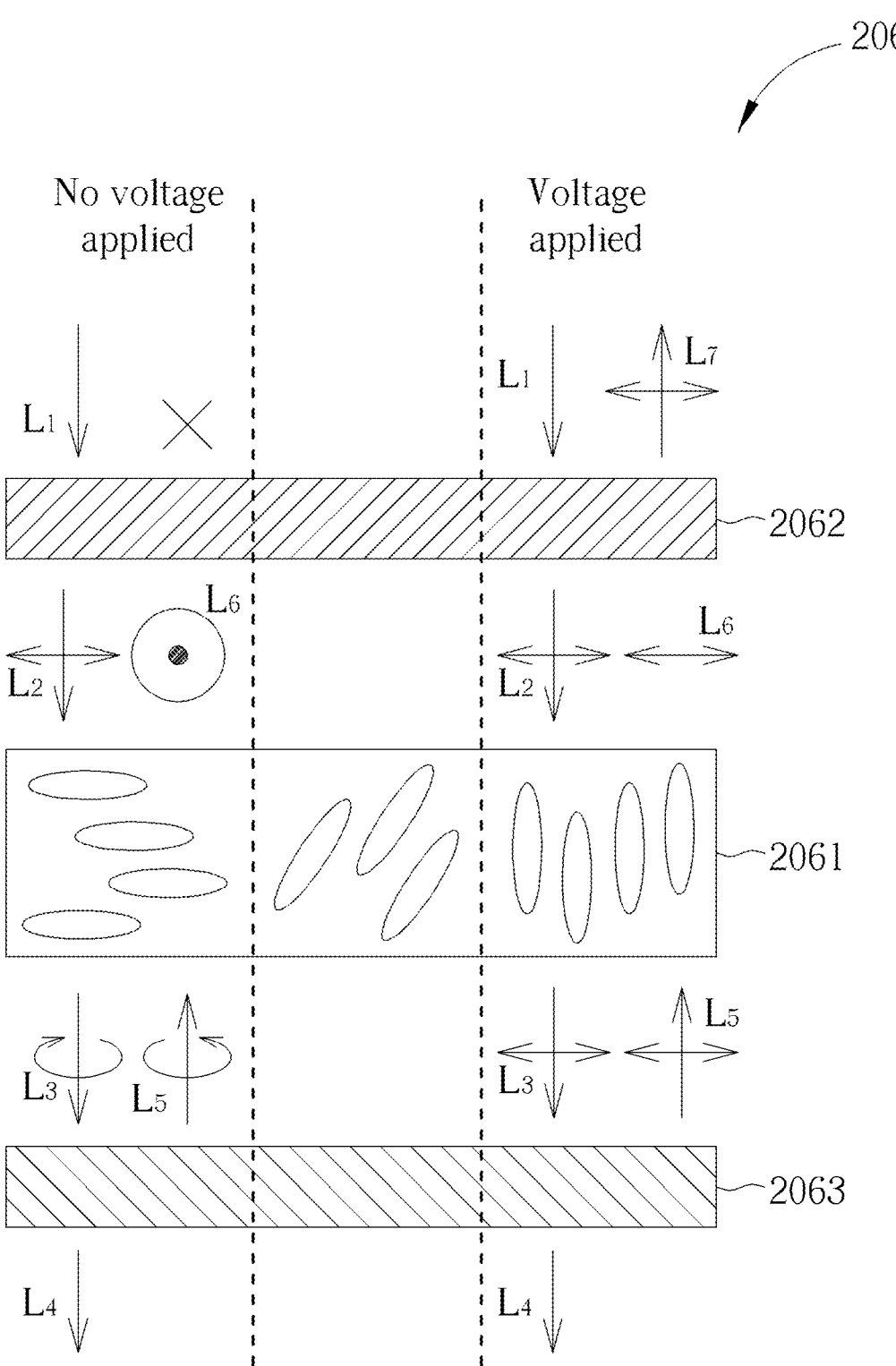
FIG. 7 illustrates a control scheme of the see-through display modules shown in FIG. 1B according to an embodiment of the present invention.

FIG. 7 illustrates a control scheme of the see-through display modules 206 shown in FIG. 1B according to an embodiment of the present invention. For example, any see-through display module 206 among the see-through display modules 206 may comprise a polarization converter 2061 disposed between a polarization component 2062 and a partially reflecting mirror component 2063, but the present invention is not limited thereto. According to some embodiments, the architecture of the see-through display module 206 may vary. In addition, the polarization component 2062 confines the polarization state of the ambient light, the partially reflecting mirror component 2063 reflects and transmits the ambient light, and the polarization converter 2061 converts the polarization state of the ambient light passed through the polarization component 2062. It should be noted that at least one of the polarization component 2062, the partially reflecting mirror component 2063 and the polarization converter 2061 is a liquid crystal panel with active matrix connected to the driver circuit 120 for displaying the display content according to the control signal. In an embodiment, as shown in FIG. 7, when the polarization converter 2061 displays the display content according to the control signal and ambient light L1 hits the polarization component 2062 of the see-through display modules 206, the ambient light L1 passes through three components to become transmitted lights L2, L3 and L4 respectively. Additionally, part of the transmitted light L3 is reflected by the partially reflecting mirror component 2063 and passes through the polarization converter 2061 and the polarization component 2062, as shown by a reflected light L5 and transmitted lights L6 and L7 in FIG. 7. In this way, the wearer may see the transmitted light L4—that is, the wearer may see his/her surroundings (e.g., roads and scenery) from the back side of the see-through displayable eyewear 100, as shown in FIG. 1B. This is for illustrative purposes only, and is not meant to be a limitation of the present invention. According to some embodiments, the architecture shown in FIG. 7 may vary.

It is an advantage of the present invention that, the see-through displayable eyewear 100 and the control system 20 of the present invention can ensure efficient control to enhance overall performance. For example, the application scope and functional requirements of the one-way reflective eyewear are becoming more and more diverse with the popularization thereof, but existing control schemes in the related art face some key issues that affect the performance and user experience of such smart eyewear:

(1) Insufficient display module efficiency: the existing one-way reflective eyewear in the related art has the problems of excessive delay or excessive power consumption when displaying information, resulting in unstable display effects or insufficient battery life, affecting users' daily experience;

(2) Non-intuitive interface interaction: the existing control system lacks an intuitive, flexible and easy-to-operate interactive interface between the user and the eyewear device, which causes the user to undergo many steps and/or extremely complicated operations, affecting the convenience;

(3) Insufficient developer support: the support for developers is limited, and it is difficult to provide a friendly development environment, which causes great difficulty in developing new features and respond quickly to market demands, where the scalability and compatibility of existing systems are limited, which increases the complexity of product upgrades and functional expansion; and (4) Poor product integration: the lack of integration between the hardware and software systems of smart eyewear leads to low device operation efficiency and inconsistent user experience, making it difficult to achieve the highly intelligent operation that users expect.

In contrast, the see-through displayable eyewear 100 and the control system 20 of the present invention can optimize the performance of the see-through display module, improve the human-machine interaction experience, and provide developers with complete development tools and interfaces, thereby achieving a closed-loop development process from design to application. In addition, the see-through displayable eyewear 100 and the control system 20 thereof can solve the related art problems without introducing any side effect or in a way that is less likely to introduce a side effect.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A see-through displayable eyewear comprising:

a front surface and a back surface wherein the see-through displayable eyewear is arranged to display graphic contents to a passersby viewing the see-through displayable eyewear from the front surface and allowing a wearer of the see-through displayable eyewear to view from the back surface, the see-through displayable eyewear further comprising:

at least one see-through display module, arranged to display the graphic contents while allowing the wearer to view with at least one eye of the wearer wherein the at least one see-through display module includes at least one liquid crystal display (LCD) panel disposed between at least one partially reflective mirror coating and a polarization converter;

at least one driver circuit, coupled to the at least one see-through display module, arranged to drive the at least one see-through display module;

at least one computation unit, coupled to the at least one driver circuit, arranged to control operations of the see-through displayable eyewear, the operations comprising at least one command transmission operation, at least one command reception operation and at least one computation operation;

at least one memory unit, coupled to the at least one computation unit, arranged to store the graphic contents;

a wireless unit, coupled to the at least one computation unit, arranged to perform wireless communication with an external device for the see-through displayable eyewear, to allow the wearer to control the see-through displayable eyewear via the external device; and a power unit, coupled to the at least one see-through display module, the at least one driver circuit, the at least one computation unit, the at least one memory unit, and the wireless unit, arranged to provide power to the at least one see-through display module, the at least one driver circuit, the at least one computation unit, the at least one memory unit, and the wireless unit.

2. The see-through displayable eyewear of claim 1, wherein the at least one command transmission operation comprises an operation of transmitting a playback command to the at least one see-through display module; the at least one command reception operation comprises an operation of receiving an external command from the external device; and the at least one computation operation comprises multiple image processing operations as well as flow control and logic determination operations, wherein the multiple image processing operations comprise one or a combination of blending, color replacement and format conversion.

3. The see-through displayable eyewear of claim 1, wherein the at least one see-through display module comprises multiple see-through display modules; the at least one driver circuit comprises multiple driver circuits respectively corresponding to the multiple see-through display modules; the at least one computation unit comprises multiple computation units for controlling the multiple see-through display modules via the multiple driver circuits, respectively, wherein one of the multiple computation units is arranged to act as a master computation unit and another of the multiple computation units is arranged to act as a slave computation unit; and timing of the slave computation unit is synchronized with timing of the master computation unit to guarantee simultaneously displaying a first set of graphic/text contents and a second set of graphic/text contents among the graphic contents with the multiple see-through display modules, respectively.

4. The see-through displayable eyewear of claim 1, wherein the at least one memory unit is arranged to store the graphic contents as well as firmware codes regarding controlling the operations of the see-through displayable eyewear.

5. The see-through displayable eyewear of claim 1, wherein a control module outside the see-through displayable eyewear comprises a software sub-module running on the external device and a backend sub-module running on a remote device, wherein the external device is arranged to link to the remote device to allow the see-through displayable eyewear to operate under control of the control module; the software sub-module running on the external device is arranged to provide a human-machine interface, allowing a user which is the wearer to operate integrated functions while observing information on the see-through displayable eyewear, for achieving user login of the user, device binding of the see-through displayable eyewear with an account of the user, device function setting of the see-through displayable eyewear, controlling pictures, and reading device information comprising battery level and troubleshooting contacts; and the backend sub-module running on the remote device is arranged to provide an engineering human-machine interface that not only enables a function for software execution, but also provides an account verification mechanism, device data storage and association, error code logging, and troubleshooting suggestions.

6. The see-through displayable eyewear of claim 5, wherein multiple picture control functions of controlling the pictures comprise one or a combination of respective functions of editing, purchasing, selling via financial flow, transmitting, and receiving, for providing a platform for multiple users, the multiple users comprising the user, to interact with each other.

7. The see-through displayable eyewear of claim 5, wherein the backend sub-module running on the remote device is arranged to further provide management and information security functions, the management and information security functions comprising:

a function of multi-user management, for managing, by the backend sub-module, multiple user accounts, and providing, by the backend sub-module, device binding of a plurality of see-through displayable eyewear comprising the see-through displayable eyewear with the multiple user accounts, respectively, user login authentication, and data synchronization between multiple devices; and a function of security and data encryption, for protecting, by the backend sub-module, security of image contents and user data via encryption technology, for application in data transmission and storage.

8. The see-through displayable eyewear of claim 1, wherein the power unit is implemented by way of one or a combination of a power storage device and a power generation device.

9. The see-through displayable eyewear of claim 1, wherein a control module outside the see-through displayable eyewear comprises a software sub-module running on the external device and a backend sub-module running on a remote device, wherein the external device is arranged to link to the remote device to allow the see-through displayable eyewear to operate under control of the control module; and at least one of the see-through displayable eyewear and the software sub-module running on the external device is arranged to link to at least one sensing device, to allow the see-through displayable eyewear to display the graphic contents according to a user context captured by the at least one sensing device, wherein the at least one sensing device comprises one or a combination of at least one motion sensor, at least one light sensor, at least one camera and at least one touch sensor.

10. The see-through displayable eyewear of claim 1, wherein a control module outside the see-through displayable eyewear comprises a software sub-module running on the external device and a backend sub-module running on a remote device, wherein the external device is arranged to link to the remote device to allow the see-through displayable eyewear to operate under control of the control module; and in a situation where the see-through displayable eyewear is linked to an external module as a replacement of the control module, the see-through displayable eyewear is arranged to operate under control of the external module, to allow a leader owning the external module to control displaying of the see-through displayable eyewear via the external module, in either a manual manner or an automatic manner.

11. The see-through displayable eyewear of claim 10, wherein the external module is implemented as a central control device for controlling a plurality of see-through displayable eyewear at a same time; and the see-through displayable eyewear as one of the plurality of see-through displayable eyewear is equipped with a set of application interfaces (APIs), allowing at least one external application or service to control image display and sensor data reading of the see-through displayable eyewear, and send commands to control brightness and content update of the at least one see-through display module.

12. The see-through displayable eyewear of claim 11, wherein for achieving information security and providing core functions regarding the see-through displayable eyewear to at least one third-party developer or partner at a same time, the see-through displayable eyewear is arranged to operate with:

security of third-party extensions, the security of third-party extensions defining at least one security mechanism for using the APIs and extension modules, for ensuring that none of third-party software and third-party hardware will endanger system security, wherein encryption technology, user authentication mechanism and permission control are introduced in the at least one security mechanism to ensure data integrity and privacy; and a permission management system in the backend sub-module, the permission management system for strictly controlling access permissions for the third-party software and the third-party hardware, wherein the permission management system is arranged to provide a hierarchical permission control mechanism, allowing an administrator to set access levels for different third-party modules or APIs to ensure that only authorized applications are capable of accessing specific functions.

13. The see-through displayable eyewear of claim 1, wherein displaying the graphic contents has limited effect to the wearer's sight.

14. The see-through displayable eyewear of claim 1, wherein any LCD panel among the at least one LCD panel comprising multiple pixels disposed in a two-dimensional (2D) array arrangement to display the graphic contents, wherein optical properties of the multiple pixels are controlled with passive or active matrix circuitry and a display driver integrated circuit.

15. The see-through displayable eyewear of claim 14, wherein the multiple pixels comprise one hundred or more pixels, and an aperture ratio of the multiple pixels is greater than or equal to 80%.

16. The see-through displayable eyewear of claim 1, further comprising:

a wired communication unit, coupled to the at least one computation unit, arranged to perform wired communication with another external device for the see-through displayable eyewear, to allow the wearer to control the see-through displayable eyewear via the other external device;

wherein the at least one command reception operation comprises an operation of receiving an external command from the other external device.

17. The see-through displayable eyewear of claim 1, wherein at least one partial memory among the at least one memory unit is integrated into the at least one computation unit.

18. The see-through displayable eyewear of claim 1, wherein the at least one computation unit is implemented by way of at least one microcontroller unit (MCU), the at least one memory unit is implemented by way of one or a combination of at least one non-volatile memory and at least one volatile memory, the wireless unit is implemented by way of at least one wireless communication circuit, and the power unit is implemented by way of one or a combination of a power storage device and a power generation device.

19. A control system comprising of the see-through displayable eyewear of claim 1.

\* \* \* \* \*